(12) United States Patent
Ropp

(10) Patent No.: US 7,594,755 B2
(45) Date of Patent: Sep. 29, 2009

(54) SEAT SUSPENSION BEARING SYSTEM

(75) Inventor: Dale Ropp, Buda, IL (US)

(73) Assignee: Sears Manufacturing Co., Davenport, IA (US)

( * ) Notice: Subject to any disclaimer, the term of this patent is extended or adjusted under 35 U.S.C. 154(b) by 396 days.

(21) Appl. No.: 11/707,246

(22) Filed: Feb. 13, 2007

(65) Prior Publication Data

US 2008/0193062 A1  Aug. 14, 2008

(51) Int. Cl.
 *F16C 29/12* (2006.01)
(52) U.S. Cl. .......................................... 384/34; 384/40
(58) Field of Classification Search .................. 384/34, 384/40, 57; 248/429
See application file for complete search history.

(56) References Cited

U.S. PATENT DOCUMENTS

| | | |
|---|---|---|
| 2,342,946 A | 2/1944 | Le Tourneau |
| 3,649,090 A | 3/1972 | Dutot |
| 4,114,945 A | 9/1978 | Lutz |
| 4,516,811 A | 5/1985 | Akiyama et al. |
| 4,773,769 A | 9/1988 | Church |
| 4,941,758 A | 7/1990 | Osawa |
| 5,584,460 A | 12/1996 | Ropp |
| 5,681,116 A | 10/1997 | Lin |
| 5,938,340 A | 8/1999 | Brodersen |
| 6,264,180 B1 | 7/2001 | Ropp |

FOREIGN PATENT DOCUMENTS

| | | |
|---|---|---|
| DE | 1765669 | 4/1958 |
| DE | 1933975 | 3/1966 |
| DE | 1993291 | 9/1968 |
| DE | G8634267.3 | 3/1987 |
| GB | 436631 | 10/1935 |
| GB | 479559 | 2/1938 |
| GB | 816050 | 7/1959 |
| GB | 819738 | 9/1959 |
| GB | 899 151 A | 6/1962 |
| GB | 931288 | 7/1963 |
| GB | 1214896 | 12/1970 |
| WO | WO 82/00321 | 9/1982 |

OTHER PUBLICATIONS

EP Search Report, Aug. 20, 2008.

*Primary Examiner*—Thomas R Hannon
(74) *Attorney, Agent, or Firm*—Niro, Scavone, Haller & Niro

(57) ABSTRACT

An adjustable bearing system, one ideally suited for use in vehicle seat suspension for aft positioning assemblies and isolator assemblies, and having an adjustment mechanism that is readily accessible and easy to use. The adjustable bearing system includes a first structure, a second structure, and a bearing adjustably disposed between said first and second structures for facilitating movement of one structure relative to the other. A bearing driver is positioned to engage a non bearing surface of the bearing and to adjust the position of the bearing relative to said first and second structures, and an actuator cooperates with the bearing driver to permit adjustment of the bearing's position.

6 Claims, 1 Drawing Sheet

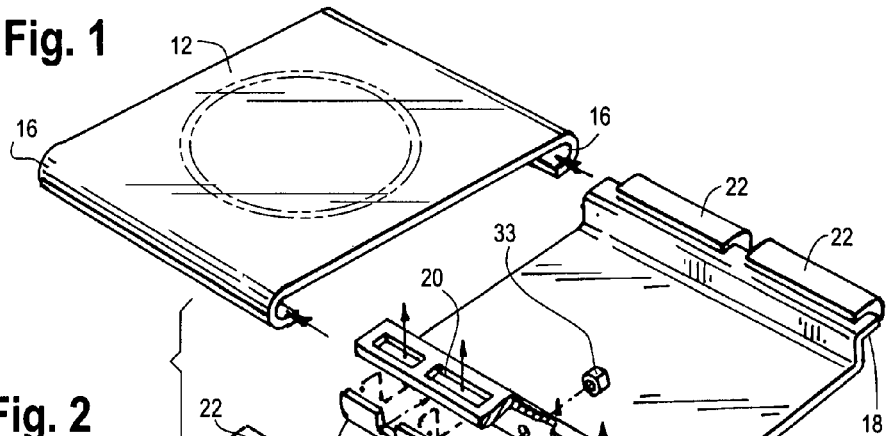
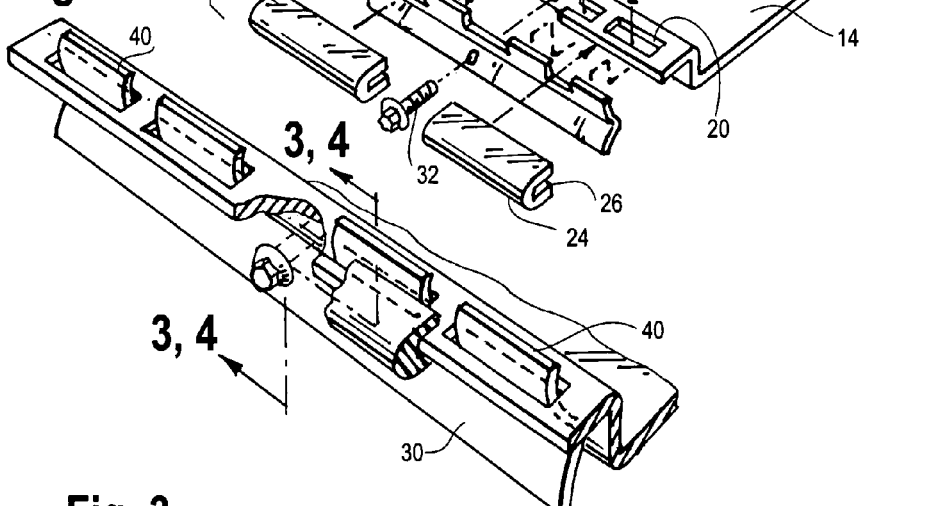
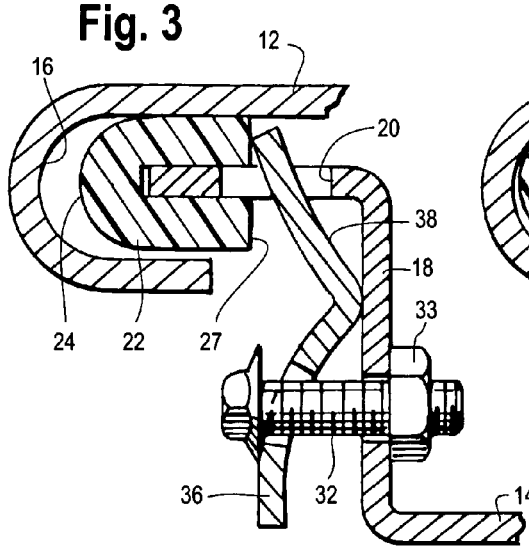
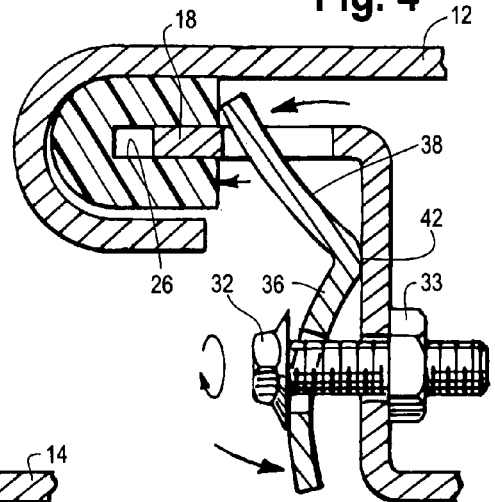

SEAT SUSPENSION BEARING SYSTEM

BACKGROUND OF THE INVENTION

The present invention is directed generally to the field of adjustable slide bearings and more particularly to the use of adjustable slide bearings in seat equipment. The invention finds advantageous use in vehicle seating that uses fore and aft slide adjustment, as well as fore and aft and/or lateral isolating systems.

In vehicle seat design it is often important to adjust the fore/aft location of the seat or to isolate the seat occupant from various forces generated in the course of the vehicle's operation. As a result a wide variety of fore and aft adjustment mechanisms and "isolators" have been developed and marketed. In most of these adjustment mechanisms and isolators, there are two structures or seat suspension components that move back and forth or oscillate relative to one another. To facilitate this relative movement between seat suspension components, various bearing systems have been implemented. One such bearing system, which permits adjustment of slide bearings used in the design, is that disclosed in U.S. Pat. No. 5,938,340. This patented design has enjoyed substantial commercial success, but nevertheless suffers from the disadvantage that it is relatively difficult to adjust the position of the bearings for optimal operation of the suspension.

SUMMARY OF THE INVENTION

The present invention is directed to an improvement over the design disclosed in U.S. Pat. No. 5,938,340. The invention comprises an adjustable bearing system, one ideally suited for use in vehicle seat suspension fore and aft positioning assemblies or isolator assemblies and having an adjustment mechanism that is readily accessible and easy to use. The adjustable bearing system of the present invention includes a first structure, a second structure, and a bearing adjustably disposed between said first and second structures for facilitating movement of one structure relative to the other. A bearing driver is positioned to engage a non bearing surface of the bearing and to adjust the position of the bearing relative to said first and second structures, and an actuator cooperates with the bearing driver to permit adjustment of the bearing's position.

In accordance with one embodiment of the invention, the bearing is in the form of a slide bearing and the bearing driver is an elongated bar having a cross section that defines levers which act in response to operation of the actuator to move the bearing to its optimal position within the assembly.

BRIEF DESCRIPTION OF THE DRAWINGS

The novel features which are characteristic of the present invention are set forth in the appended claims. However, the invention's preferred embodiments together with further objects and attendant advantages will be best understood by reference to the following detailed description taken in connection with the accompanying drawings in which:

FIG. 1 is an exploded perspective view illustrating the various components of one preferred embodiment of the present invention;

FIG. 2 is a partial perspective view showing some of the components illustrated in FIG. 1 in assembled relation; and FIGS. 3 and 4 are a cross section views taken along line 3,4-3,4 of FIG. 2 and illustrating the functional operation of the preferred embodiment.

DETAILED DESCRIPTION OF THE PREFERRED EMBODIMENTS

With reference to FIGS. 1 and 2, the adjustable bearing system of the preferred embodiment is shown to include first and second structures, or seat suspension components, in the form of reciprocating plates 12 and 14. Plate 12 has opposing side channels 16, while plate 14 has opposing side flanges 18. One of the side flanges 18 is provided with a plurality of apertures 20.

A bearing, or a plurality of bearings, in the form of slide bearings 22 are adjustably disposed between plates 12 and 14. Each of the slide bearings is fabricated from a suitable high lubricity material, such as nylon, acetal, fluoropolymer or oil impregnated bronze, and has an external bearing surface 24 that is sized and configured to slidingly engage the inside of channel 16. Each bearing 22 also has an inner surface or recess 26 adapted to slidingly receive the free end of flange 18, and a back or non bearing surface 27.

The bearing system of the preferred embodiment also includes a bearing driver, in the form of elongated bar 30, and an actuator shown in the form of threaded stud 32. Threaded stud 32 cooperates with a threaded aperture or nut 33 on bar 30. As best illustrated in FIGS. 3 and 4, the drive bar 30 has a generally "L" shaped cross section with the legs of the "L" defining first and second lever arms 36 and 38. The free end of the second lever arm 38 terminates with fingers 40 that extend through the apertures 20 of side flange 18. The angle of the "L" defines a fulcrum 42 about which the arms 36 and 38 may pivot when adjusting the position of bearings 18.

When the seat suspension utilizing the preferred embodiment of the present invention is being assembled, it is desirable that the plates 12 and 14 slide freely relative to one another, but yet are relatively free of undesired lateral movement or "play". To achieve that end, the lateral position of bearings 22 relative to both the channel 16 and flange 18 may be adjusted simply by operation of the threaded stud actuator 32. As shown in FIGS. 3 and 4, when the stud 32 is threaded into the bar 30, the head of the stud acts on lever arm 36 which, in turn, pivots lever arm 38 about fulcrum 42. As a result, the fingers 40 engage the back or non bearing surface 27 of bearings 22 and move the bearings 22 laterally along the free end of flange 18 and toward channel 16. In this manner the position of bearings 22 may be easily and optimally adjusted. In the same way, the bearings' positioning in the assembly may be easily adjusted when the seat equipment is in the field without any disassembly.

In the illustrated embodiment, the adjustment mechanism is used on only one side of the plates, with the bearings 22' on the other side of the assembly remaining in fixed position. If desired, the adjustment mechanism may be employed on both sides of the assembly. So too, individual bar and actuator subassemblies may be used with each of the slide bearings. It has been found, however, that the use of a single bar and actuator subassembly on just one side of the isolator plates, as illustrated and described here, provides the optimum combination of utility and cost.

It will be appreciated by those skilled in the art that still further changes and modifications may be made to the illustrated embodiments without departing from the spirit of the present invention. All such modifications and changes are intended to be covered by the appended claims.

The invention claimed is:

1. An adjustable bearing system, comprising:
   a first structure;
   a second structure;
   a bearing adjustably disposed between said first and second structures, wherein the bearing comprises a plurality of slide bearings, each having an external bearing surface configured to slidingly engage the first structure and an internal recess configured to slidingly engage an elongated flange mounting member of the second structure for facilitating movement of one structure relative to the other structure;
   a bearing driver positioned to engage a non bearing surface of the bearing and to adjust the position of the bearing relative to said first and second structures; and
   an actuator cooperating with the bearing driver to permit adjustment of the bearing position.

2. The adjustable bearing system of claim 1 wherein the bearing driver comprises an elongated bar with a cross section having first and second lever arms, and wherein operation of the actuator causes the first and second lever arms to pivot about a fulcrum and to thereby adjust the position of the bearing.

3. The adjustable bearing system of claim 2 wherein the driver bar has a generally L shaped cross section with each leg of the L defining one of the lever arms and the angle of the L defining the fulcrum.

4. The adjustable bearing system of claim 2 wherein the second lever arm has a distal end terminating in a pair of fingers with each finger engaging the non bearing surface of the bearing.

5. The adjustable bearing system of claim 1 wherein the second structure elongated flange mounting member has a plurality of apertures and the bearing driver comprises an elongated bar having a plurality of fingers, with each of the fingers extending through one of the apertures on the driver bar and engaging the non bearing surface of the bearing.

6. An adjustable bearing system for facilitating the movement of seat suspension components, comprising:
   a first seat suspension component having opposing side channels;
   a second seat suspension component having opposing side flanges and with one of the side flanges having a plurality of apertures;
   a plurality of adjustable bearings disposed between the side channels of said first component and the side flanges of said second component, each of the bearings having an external bearing surface configured to slidingly engage a side channel and an inner recess to slidingly engage a side flange;
   a bearing driver comprising an elongated bar mounted to the second component adjacent to said one flange and having a plurality of fingers extending through the apertures and into engagement with a non bearing surface of at least one of the bearings; and
   an actuator cooperating with the bearing driver so that operation of the actuator causes the driver fingers to engage and properly position the at least one bearing between the first component side channel and the second component side flange.

* * * * *